United States Patent [19]

Yamaguma et al.

[11] 4,368,621
[45] Jan. 18, 1983

[54] METHOD OF OPERATING AIR CONDITIONER

[75] Inventors: Naoto Yamaguma; Jyoji Okamoto, both of Yanai; Tadahisa Masai, Yamaguchi; Takeshi Imaizumi, Matsudo; Yoshihiro Okita, Tokyo, all of Japan

[73] Assignee: Hitachi, Ltd., Tokyo, Japan

[21] Appl. No.: 279,069

[22] Filed: Jun. 30, 1981

[30] Foreign Application Priority Data

Jun. 30, 1980 [JP] Japan .................................. 55-87865

[51] Int. Cl.³ ............................................... F25B 5/00
[52] U.S. Cl. ........................................ 62/117; 62/199; 165/22
[58] Field of Search ..................... 165/22; 62/175, 199, 62/117

[56] References Cited

U.S. PATENT DOCUMENTS 4,187,543  2/1980  Healey .............................. 165/22 X
4,192,455  3/1980  Rasmussen et al. ............... 165/22 X
4,285,205  8/1981  Martin et al. ...................... 62/199 X Primary Examiner—William E. Wayner
Attorney, Agent, or Firm—Antonelli, Terry and Wands

[57] ABSTRACT

Disclosed is a method of operating an air conditioner having a plurality of indoor units connected to a common outdoor unit as heat source machine. When operation of a plurality of indoor units is dictated depending upon the temperature differences between the room temperatures and the set temperatures therefor, the indoor unit having the smallest temperature difference is determined among those indoor units which are to operate, and the amount of heat exchange is limited in the indoor unit having the smallest temperature difference to advantageously perform air conditioning in respective rooms in which the indoor units are provided.

4 Claims, 3 Drawing Figures

METHOD OF OPERATING AIR CONDITIONER

BACKGROUND OF THE INVENTION

The present invention relates to a method of operating an air conditioner of the type using refrigerant and having a plurality of evaporator fan units located in individual rooms requiring air conditioning (indoor units) connected to a common compressor-condenser unit (outdoor unit) for receiving refrigerant therefrom, such that a desired number of indoor units are operated at a time.

In the field of air conditioning, it is desired to operate as many indoor units as possible with a common outdoor unit at a time. However, the number of indoor units connected to a single outdoor unit is limited since the outputs of respective indoor units are reduced to provide unfavorable air conditioning in case the sum of outputs of all the indoor units is beyond the capability of the outdoor unit. Therefore, for increasing the number of the indoor units, it has been necessary to correspondingly increase the capacity of the outdoor unit, resulting in a raised cost of the air conditioning system as a whole.

In case the sum of outputs of indoor units is equal to the output of a single outdoor unit and the indoor units are increased in number, respective lengths of refrigerant pipes between the common outdoor unit and respective indoor units are varied depending on the room arrangement in a house. In other words, the ratio of the length of the shortest refrigerant pipe to that of the longest refrigerant pipes is greatly varied as the number of the indoor units is increased. When all the indoor units are operated at a time, the indoor unit remote from the outboard machine, i.e. the indoor unit connected to the outdoor unit through comparatively long refrigerant pipes can share only a small part of the refrigerant, and cannot fully exert the cooling power.

To avoid this problem, in conventional air conditioners of the kind described, various measures are taken in an effort to make respective lengths of the refrigerant pipes substantially constant.

SUMMARY OF THE INVENTION

Accordingly, it is an object of the invention to provide the above-described problems of the prior art in air conditioners of the type having a plurality of indoor units connected to a single outdoor unit, by performing an air conditioning in respective rooms without inconvenience when a plurality of indoor units are operated at a time.

To this end, according to the invention, there is provided a method of operating an air conditioning system of the type having a plurality of indoor units connected to a single outdoor unit, the method comprises: detecting, when operation instructions are given to a plurality of indoor units, the differences between set temperatures and actual room temperature associated with respective indoor units; limiting amounts of heat exchange effected in the indoor unit or units associated with those rooms in which actual room temperature have not reached the set temperatures but the temperature differences are relatively small, circulating an adequate amount of refrigerant in other indoor units; and operating those indoor units in which heat exchange has been limited when said temperature differences in said other rooms become small.

The above and other objects, as well as advantageous features of the invention will become clear from the following description of the preferred embodiments taken in conjunction with the accompanying drawings.

DESCRIPTION OF THE PREFERRED EMBODIMENTS

Figure 1:
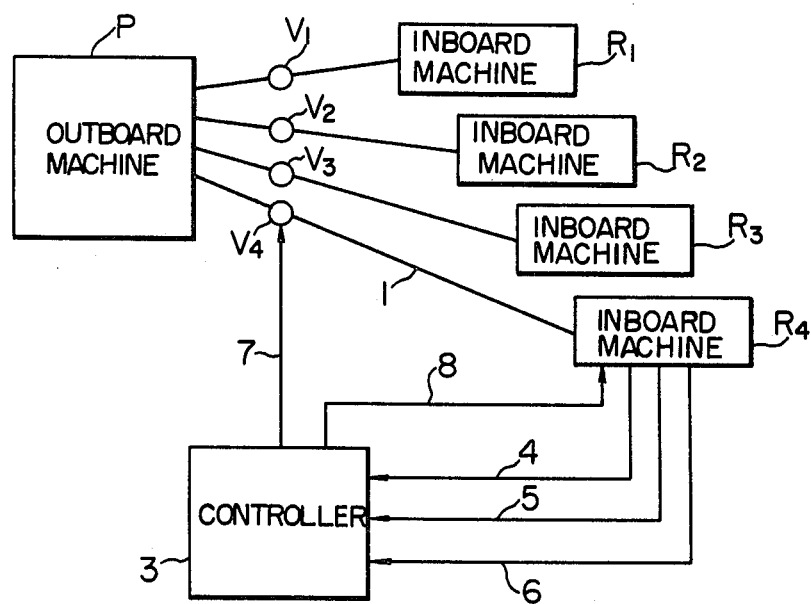
FIG. 1 shows an arrangement of an air conditioner to which the present invention pertains.

Referring first to FIG. 1, there is shown an air conditioner to which the present invention pertains, and which comprises four sets of indoor units $R_1$ to $R_4$ are connected to a common outdoor unit P by means of refrigerant pipes 1. The capacity of the outdoor unit P is smaller than the sum of the capacities of the indoor units $R_1$ to $R_4$, but is equal to or more than the sum of three out of the four indoor units $R_1$ to $R_4$. The indoor units $R_1$ to $R_4$ are connected to the outdoor unit P through refrigerant pipes 1 of different lengths. In operation, a refrigerant which is typically freon is circulated between the outdoor unit P and respective indoor units $R_1$ to $R_4$ to effect cooling or heating in respective rooms. Each indoor unit is provided with a temperature-sensitive type automatic expansion valve. Solenoid valve $V_1$ to $V_4$ are provided either in refrigerant inlet pipe portions or return pipe portions of the refrigerant pipes 1.

A reference numeral 3 denotes a controller for controlling the operation of the air conditioner, and which comprises a computer or the like. The controller 3 is adapted to receive various input signals from the respective indoor units $R_1$ to $R_4$, including signals 4 representative of on-off conditions of power switches of respective indoor units, signals 5 representative of set temperatures $T_c$ for respective rooms, signals 6 representative of actual room temperatures $T_R$ and so forth, and delivers various output signals including signals 7 for commanding the solenoid valves $V_1$ to $V_4$ to open and close, signals 8 for commanding the blowers (not shown) in the respective indoor units $R_1$ to $R_4$ to start or stop, and so forth.

Figure 2:
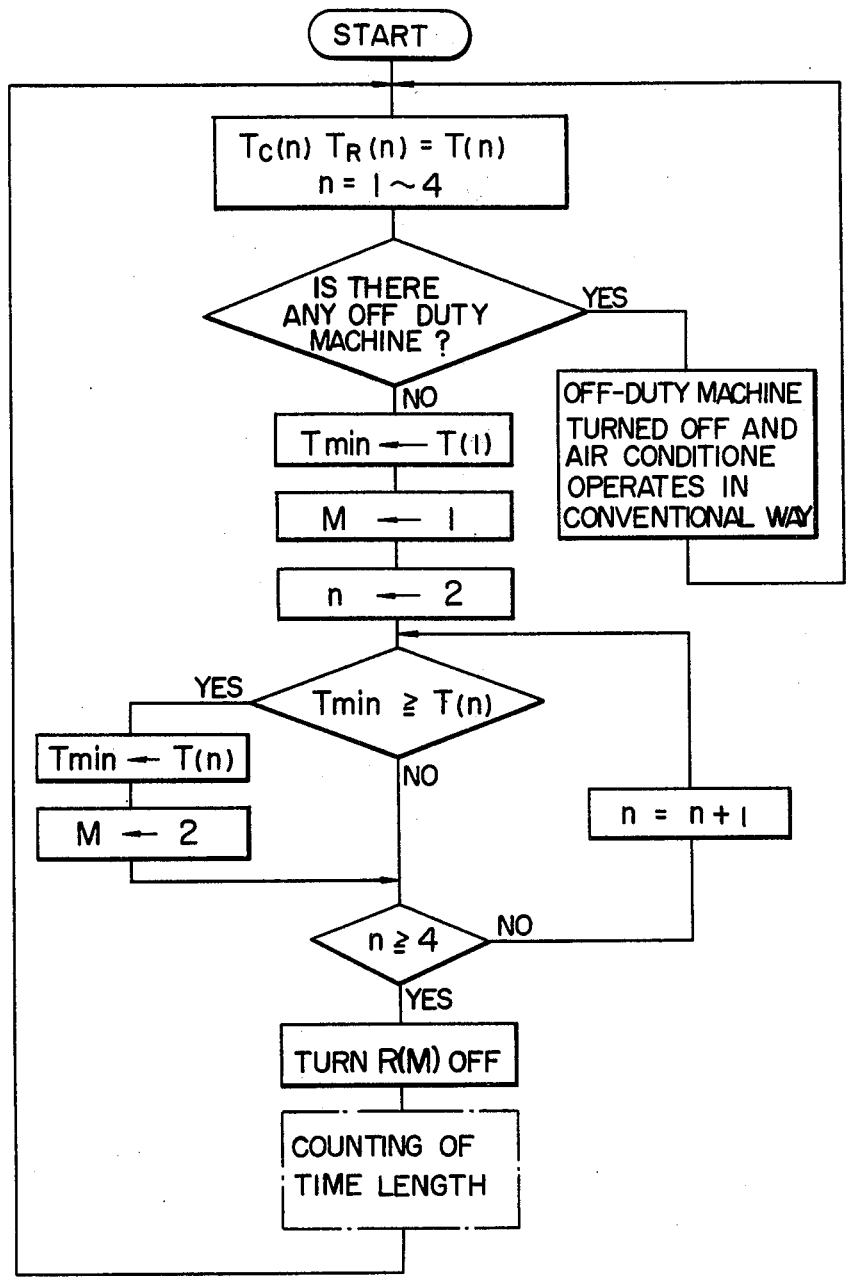
FIG. 2 is a flow chart of an operation method in accordance with the invention.
Figure 3:
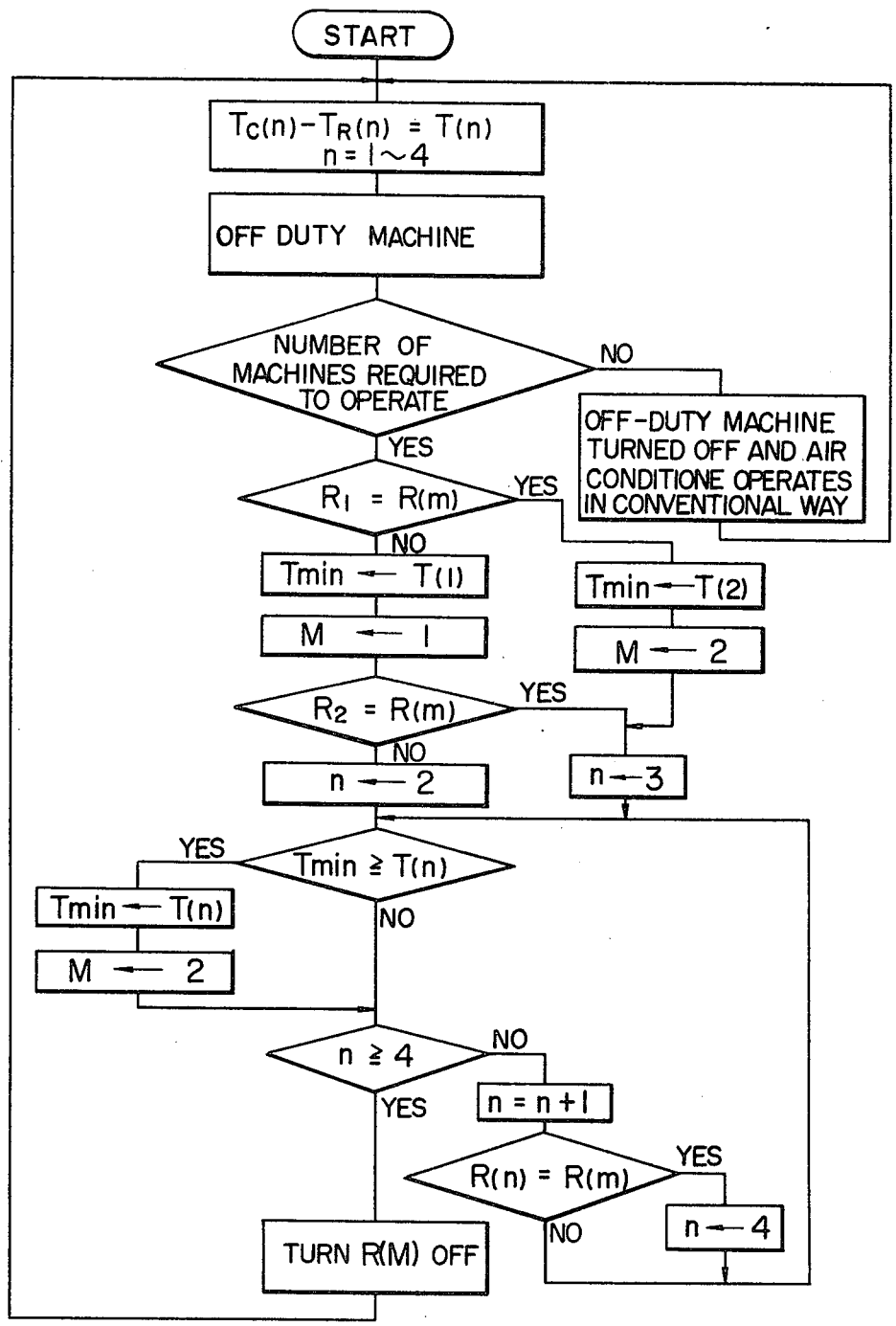
FIG. 3 is a flow chart of an operation method in accordance with another embodiment of the invention.

The controller 3 operates in accordance with the flow charts shown in FIGS. 2 and 3.

Referring first to FIG. 2, there is shown the first embodiment of the present invention, in which it is assumed here that the air conditioner is operating for heating the rooms with the power switches of all indoor units $R_1$ to $R_4$ turned on. The controller 3 receive through its terminals 5 and 6 signals representative of set temperatures $T_c$ and of room temperatures $T_R$ for the respective indoor units $R_1$ to $R_4$, and determines the temperature differences T(n) between the room temperature $T_R(n)$ and the set temperature $T_C(n)$ for respective indoor units. However, determination of the temperature differences is not effected for the indoor units the power switches of which have been turned off. In the foregoing description, the symbol (n) represents numerals 1 to 4 corresponding to the suffixes 1 to 4 to the symbols $R_1$ to $R_4$ representing the indoor units.

Then, the controller 3 makes a judgement as to whether there are any indoor unit or units R(n) which are not required to operate because the temperature differences $T(n)$ are zero or negative, i.e. $T(n) \leq 0$, to hold the associated thermostats off, as well as whether there are any indoor unit or units the power switches of which have been turned off.

In the affirmative case, the number of the duty indoor units is three or less, and the controller 3 outputs through the terminals 7 and 8 signals for turning off the solenoid valves $V(n)$ and the blower of the indoor units which are not required to operate.

In the negative case, i.e. when the number of the duty indoor units is four, the controller 3 determines the indoor unit the temperature difference $T(n)$ of which is the smallest among the all, and stops such an indoor unit to operate. More specifically, in the controller 3 the temperature difference $T(1)$ of the indoor unit $R(1)$ is assumed to be $T_{min}$ and a value "1" is memorized. Then, the controller 3 reads out the temperature difference $T(2)$ for the indoor unit $R_2$ and compares the temperature difference $T(2)$ with the temperature difference $T(1)$ which is the minimum one $T_{min}$. Then, if the temperature difference $T(1)$ is judged to be smaller than $T(2)$, the controller 3 compares the temperature difference $T(3)$ with $T(1)$ which is the smallest one $T_{min}$. To the contrary, if the temperature difference $T(1)$ is equal to or greater than $T(2)$, the temperature difference $T(2)$ is assumed to be the minimum one $T_{min}$, and is compared with the temperature difference $T(3)$. In this manner, this operation is repeated until the minimum temperature difference $T_{min}$ for those of all indoor units is compared with the temperature difference $T(4)$ for the indoor unit $R(4)$, thereby to determine the indoor unit $R(M)$ the temperature difference of which is the minimum $T_{min}$. The controller 3 then produces and delivers a signal for turning off the solenoid valve $V(M)$ and the blower belonging to the indoor unit $R(M)$ of which a value M is memorized. In this state, only three indoor units are allowed to operate, so that all of these working indoor units can perform complete air conditioning in the associated rooms, because, as stated before, the capacity of the outdoor unit P well matches the sum of the capacities of three indoor units.

In such condition, the routine then is performed so as to state to successively and continuously detect the indoor units for which the temperature difference T is smallest of the all. Alternatively, this detection may be made at a predetermined time interval such as several minutes, as shown by one-dot-and-dash line in FIG. 2.

As will be understood from the foregoing description, according to the operation method of the invention, the temperature differences between actual room temperatures and set temperature are detected for all indoor units or rooms, and the indoor unit for which the temperature difference is the smallest of the all is temporarily stopped until a temperature difference between the room temperature and the set temperature for any one of the remaining rooms becomes minimum. It is, therefore, possible to effect a reasonable air conditioning of all rooms even when the capacity of the outdoor unit is exceeded by the sum of the capacities of indoor unit.

In some cases, two or more rooms may exhibit the same minimum temperature difference $T_{min}$ in the course of determining those indoor units for which the temperature differences thereof are the minimum T. In such a case, as a rule, ony that one of the indoor units of such rooms which has the greatest suffix number (n) is stopped in operation while the other indoor unit or units are allowed to operate. For instance, if the temperature differences $T(1)$ and $T(2)$ are equal to each other and minimum, the indoor unit $R(2)$ is stopped in operation while the indoor unit $R(1)$ is allowed to continue its operation. Therefore, if there is any room to which preference is given with respect to air conditioning, such a room is preferably given a smaller number of the suffix (n). The order of the preference will be reversed if the flow of YES and NO are inversed on the assumption of $T_{min} \leq T(n)$.

It is also possible to contemplate determining, in the case where a plurality of rooms exhibit an equal temperature difference $T(n)$, the preference of the air conditioning in accordance with actual levels of room temperatures. For instance, in the case of cooling, the room exhibiting a higher room temperature among those rooms in which the same temperature difference prevails is cooled preferentially. To the contrary, in the case of heating, the room exhibiting a lower temperature is cooled preferentially.

The first embodiment of the invention has been described on in the case where the air conditioner is operating in the heating mode. It will be seen that the same operation control can directly apply to the operation of the air conditioner in the cooling mode, on the assumption that the temperature difference $T(n)$ is determined by an equation of $T(n) = T_R(n) - T_C(n)$.

FIG. 3 shows a flow chart of operation in accordance with another embodiment in which, when three indoor units are required to operate, the indoor unit having the minimum difference between a set temperature and a room temperature is caused to stop, thereby preventing the drop of the cooling power of the indoor unit having connected to the longest refrigerant pipe. Thus, the flow chart shown in FIG. 3 involves therein the method shown in FIG. 2 in which four indoor units are required to operate, and any one of the four indoor units is caused to stop. The flow chart shown in FIG. 3, however, involves an additional step which is not shown in FIG. 2. Namely, according to the process shown in FIG. 3, in connection with the step of memorizing the indoor unit R(m) which is off duty due to turning off of its thermostat or power switch, and determining that indoor unit which has the smallest temperature difference, there is an additional step of checking that the indoor unit to be compared with is not that one which is off duty due to turning off of the thermostat or the power switch.

It will be appreciated that the invention can be equally applied to the cases where the capacity of the outdoor unit corresponds to the sum of the capacities of all indoor units, and where the capacity of the outdoor unit is short of the sum of all indoor units by an amount corresponding to capacities of two or more indoor units. The invention applies also to the case where, in the embodiment shown in FIG. 3, it is required to stop one indoor unit when three indoor units are required to operate. In the case where the capacity of the outdoor unit is short of the sum of the capacities of all indoor units by an amount corresponding to two or more indoor units, there must be two or more indoor units for which differences between set temperatures and room temperatures are the amallest.

In case the sum of the capacities of the indoor units corresponds to the capacity of the outdoor unit, it is possible to limit the amount of circulation or refrigerant by controlling the amount of heat exchange such that blowers having proportionally variable rotational speeds are reduced in association with those indoor units which are to operate, and have the smallest differences between the set temperatures and the room temperatures. In such a case, in the event that the control is impossible, it is possible to stop the operation of the indoor units of the smallest temperature differences.

Although the invention has been described with specific reference to embodiments in which the air conditioner incorporates a refrigerator using a refrigerant, this is not exclusive and the invention is applicable to such air conditioning systems as having an outdoor water heating boiler or a water cooler as a heat source and a plurality of indoor units or the like adapted to receive warm or cool water from the heat source. In such a case, the control of the heating or cooling power may be effected by turning on or off the blower of the indoor units or the like.

What is claimed is:

1. A method of operating an air conditioner having a plurality of indoor units connected to a common outdoor unit adapted to supply said indoor units with a heat transfer medium, said method comprising the steps of detecting, when a plurality of indoor units are required to operate, the temperature difference between the actual room temperature and the set temperature for each indoor unit; determining the indoor unit or units for which said temperature difference is the smallest of the all; and limiting the amount of heat exchange in said indoor unit or units having the smallest temperature difference.

2. A method as claimed in claim 1 wherein said indoor unit or units having the smallest temperature difference are caused to stop.

3. A method as claimed in claim 2 wherein there are provided a plurality of indoor units such that the sum of the capacities thereof exceeds that of the outdoor unit, and wherein, when the sum of the capacities of the duty indoor units is greater than the capacity of said outdoor unit, said indoor unit or units having the smallest temperature difference are caused to stop in a manner to make the sum of capacities of the indoor units well-balanced with the capacity of said outdoor unit.

4. A method as claimed in claim 1 wherein the step of determining, among the indoor units required to operate, an indoor unit having the smallest temperature difference comprises the steps of comparing the temperature difference for the second indoor unit with that for the first indoor unit so that the smaller temperature difference is selected as a reference when the both temperature differences are different from each other or either of the both temperature difference is selected as a reference when they are equal to each other in magnitude; comparing the temperature difference fro the third indoor unit with the temperature difference thus obtained as a reference; rating as the indoor unit having the smallest temperature difference that indoor unit which has remained to the last with the temperature difference as a reference; and specifying the order of said comparing step for the indoor units in those rooms which have preference with regard to air conditioning in a manner to match that specification in which either of the temperature differences is selected as a reference when they are equal to each other in magnitude.

* * * * *